Oct. 11, 1938.  O. S. BECK  2,132,923
INDICATING DEVICE
Filed Jan. 14, 1936
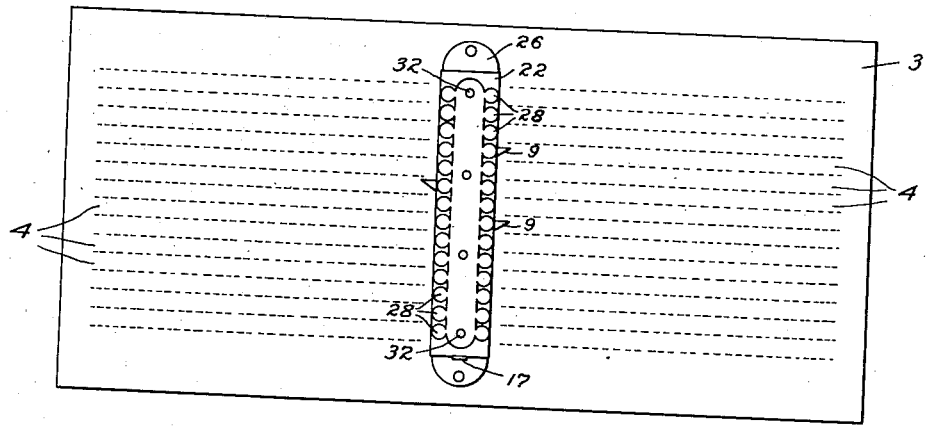
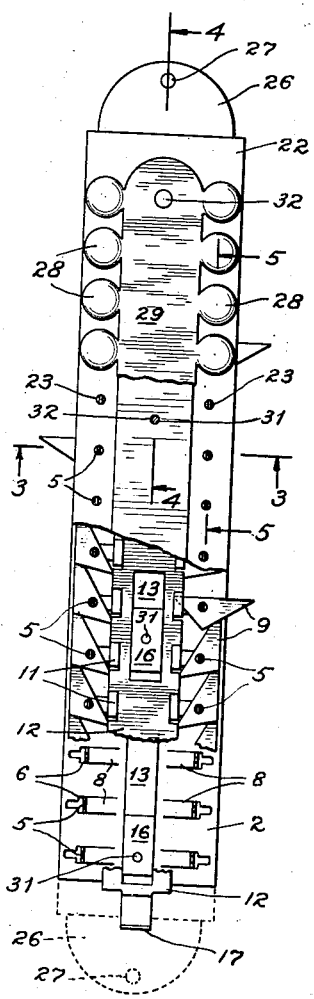
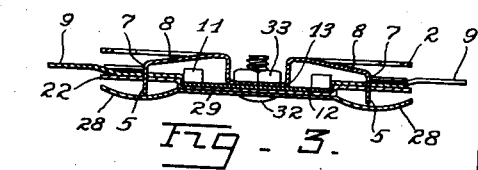
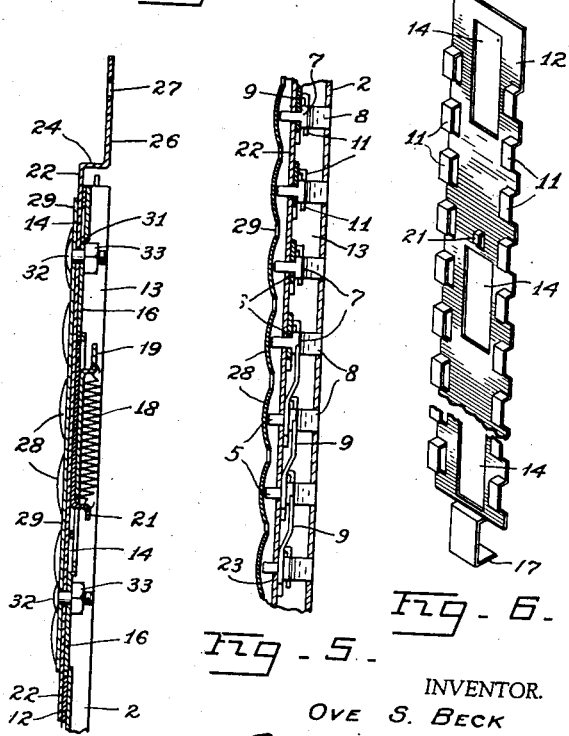
INVENTOR.
OVE S. BECK
BY Charles O. Bruce
ATTORNEY.

Patented Oct. 11, 1938

2,132,923

UNITED STATES PATENT OFFICE 2,132,923

INDICATING DEVICE

Ove S. Beck, Alameda, Calif., assignor of one-half to Leroy B. Thomas, Berkeley, Calif.

Application January 14, 1936, Serial No. 59,077

10 Claims. (Cl. 116—134)

My invention relates to indicating devices and in particular to devices adapted to visually indicate and call attention of the operator to memoranda selected by him for remembrance.

The principal object of my invention is to provide a device for indicating or pointing out items of information to be remembered.

Other objects of my invention are: to provide a device of the class described wherein selective designation of memoranda can be effected; to provide, in an indicating device employing a plurality of indicators, means for simultaneously moving the indicators from indicating to non-indicating position; and to provide an indicating device that is simple of operation.

The invention possesses numerous additional objects and advantages, some of which, together with the foregoing, will become apparent upon perusal of the following description of my invention. It is to be understood, however, that I do not limit myself to this disclosure of the species of invention, as I may adopt variant embodiments thereof within the scope of the claims.

Referring to the drawing:

Figure 1 is a plan view of an indicating device incorporating my invention as applied to a separate memorandum blank.

Figure 2 is a plan view of my indicating device. Portions of the structure are shown broken away to clearly illustrate the construction and relation of parts.

Figure 3 is a transverse sectional view, taken in a plane indicated by the line 3—3 of Figure 2.

Figure 4 is a fractional vertical sectional view, taken in a plane indicated by the line 4—4 of Figure 2.

Figure 5 is a fractional vertical sectional view, taken in a plane indicated by the line 5—5 of Figure 2. Part of the structure is shown in elevation to disclose clearly the construction.

Figure 6 is a perspective view of the frame for supporting the indicators in exposed position and for returning the same to their concealed position.

In broadly descriptive terms, my indicating device comprises a support on which is disposed a movable indicator. Means are provided for permitting movement of the indicator from a normally concealed position to an exposed position and further means are provided for returning the exposed indicator to its concealed position.

With reference to the preferred embodiment of my invention, I have chosen, for the purpose of illustration, the device shown in the drawing.

In this case the device comprises a support 2 preferably formed from a relatively thin strip of resilient metallic material having a relatively large backing 3, the exposed surface of which is divided into a plurality of memorandum areas 4 within which may be written, printed or otherwise shown separate items of information which the operator desires to designate for remembrance. It is to be understood that in some instances I may desire to extend the sides of the support to provide the necessary memoranda areas, thus dispensing with the need of a separate backing. My invention therefore contemplates the employment of either form of structure for providing the memorandum areas.

A plurality of spaced pivots 5 rising above the surface of the support 2 are provided and the same are preferably disposed, as best shown in Figure 2, in two spaced parallel rows adjacent opposite edges of the support. Each pivot is provided with shoulders 6 preferably formed by the upturned end 7 of a resilient arm 8 mounted on the support. While these arms may be separately formed and then secured to the support, I prefer, if the support be made of resilient material, to stamp or otherwise cut the arms therefrom, since this will reduce manufacturing costs and simplify assembly.

Means are provided for cooperation with the memorandum areas 4 to direct attention to such items of information as may be placed thereon. For such purpose I provide an indicator 9 preferably of triangular shape for each pivot. These indicators are mounted to swing freely on the pivots from positions of indication and non-indication with reference to their associated memorandum areas. I wish further to point out that the disposition of weight of each indicator with respect to its pivotal mounting is such that unless restrained the indicator will drop by weight of gravity toward an indicating position when the device is in its normal vertical position.

In order to limit the drop of the indicators into positions of indication with reference to their associated memorandum areas and of thereafter returning the same to their non-indicating positions, I provide means preferably comprising a plurality of spaced fingers 11 disposed in parallel rows on a frame 12 which rests on a raised shoulder 13 formed longitudinally along the central portion of the support 2. A plurality of rectangular shaped apertures 14 in the frame adapted to receive the guide members 16 formed on shoulder 13 are provided for positioning the frame on the shoulder, and, since the apertures are of greater length than the guides, the frame and consequently the fingers may be moved longitudinally of the support by means of a handle 17 mounted on one end of the frame.

The frame 12 is normally maintained in the position shown in Figure 2 by means of a resilient spring 18 (see Figure 4) one end of which is secured to a lug 19 formed on the shoulder, and the other end to a lug 21 formed on the frame. It will be observed that when the frame is in such position, each finger 11 is so disposed with relation to its associated indicator that the drop of the indicator is limited by the finger to the maximum position of indication with reference to the area 4 to be pointed out. In case the operator desires to clear the device by returning the indicators to their non-indicating positions, it is only necessary to move the frame 12 downwardly by means of the handle 17, whereby the fingers will bear against the indicators to swing the same simultaneously on their pivots to their desired positions. It is obvious that when the operator releases the handle 17 the spring, being under tension, will automatically return the frame and fingers to normal position.

I prefer that the indicators be normally concealed and for this purpose I provide a substantially flat plate 22 overlying the support 2 and having a plurality of apertures 23 in alignment with and through which the pivots 5 pass. The ends of the plate are bent inwardly to provide flanges 24 of sufficient width to accommodate the underlying structure, and these flanges are in turn provided with outturned ears 26 having apertures 27 therein through which screws or other fastening means can be inserted for securing the structure to the wall of a building or other foundation support.

It will be observed (see Figure 5) that the indicators will be clamped and frictionally held in concealed position between the pivot shoulders 6 and one face of the plate 22 by means of the resilient arms 8 and that, upon flexing the arms, the indicators will be released to fall by gravity to the limit of their indicating or exposed position as determined by the fingers 11. To provide for the flexure of the resilient arms I provide a plurality of tabulators 28 preferably resiliently supported by a sheet 29 mounted on plate 22. These tabulators overlie the exposed ends of the pivots where they project through plate 22 and are adapted when pressed inwardly by the operator to move the pivots axially, whereby the arms 8 are flexed and the indicators released. Since each tabulator is separately operable to effect release of its associated indicator, selective designation of the areas to be remembered can be readily made.

Aligned apertures 31 in sheet 29, plate 22 and guide members 16 receive bolts 32 on which nuts 33 are threaded for securing the structure together in unitary assembly.

I claim:

1. An indicating device comprising a support, a plate overlying said support, a plurality of spaced indicators pivotally mounted on said support and each movable by gravity from a concealed position beneath said plate to an exposed position adjacent an edge thereof, means for selectively releasing each of said indicators from its concealed position, means for simultaneously moving said exposed indicators to their concealed positions, and means for resiliently urging said indicators against said plate in their concealed positions.

2. An indicating device comprising a support, a plate overlying said support, a plurality of spaced indicators pivotally mounted on said support and each movable by gravity from a concealed position beneath said plate to an exposed position adjacent an edge thereof, means for resiliently urging said indicators against said plate to frictionally restrain movement thereof in their concealed positions, and means for releasing said indicators to permit gravitational movement thereof.

3. An indicating device comprising a support, a plurality of spaced indicators pivotally mounted on said support and movable by gravity from non-indicating positions to indicating positions, means for retaining said indicators in their non-indicating positions, means for selectively releasing each of said indicators for said gravitational movement from its non-indicating position to its indicating position, and means for simultaneously returning said indicators to their non-indicating positions.

4. An indicating device comprising a support, pivots having shoulders thereon disposed adjacent one face of said support, indicators disposed on said pivots, a plate disposed adjacent one end of said pivots, means for resiliently urging said pivots axially to clamp said indicators between said shoulders and said plate, and means for moving said pivots axially to release said indicators.

5. An indicating device comprising a support, spaced pivots on said support, indicators mounted for gravitational movement on said pivots from non-indicating positions to indicating positions, means for frictionally holding said indicators in their non-indicating positions, means for supporting said indicators in their indicating positions, means cooperative with said pivots for selectively releasing the indicators from said frictional holding means, and means cooperative with said supporting means for simultaneously returning said indicators from their indicating positions to their non-indicating positions.

6. An indicating device comprising a support, a plate spaced from and overlying a portion of said support, a plurality of resilient arms on said support, shouldered pivots rising from said arms, indicators mounted on said pivots between said shoulders and a face of said plate, said indicators being clamped between said shoulders and said face of the plate, and means for flexing said resilient arms to release said indicators.

7. An indicating device comprising a support, a plate spaced from and overlying a portion of said support, a plurality of resilient arms on said support, shouldered pivots rising from said arms, indicators mounted on said pivots between said shoulders and a face of said plate, said indicators being clamped between said shoulders and said face of the plate, and means overlying an end of each pivot for flexing said resilient arms to release said indicators.

8. An indicating device comprising a support, a plate spaced from and overlying a portion of said support, a plurality of resilient arms on said support, shouldered pivots rising from said arms, indicators mounted on said pivots between said shoulders and a face of said plate, said indicators being clamped between said shoulders and said face of the plate, and resiliently mounted, manually operated means above an end of each pivot for flexing said resilient arms to release said indicators.

9. An indicating device comprising a support, a plurality of resilient arms disposed on said support, a pivot disposed on each said arm, a plate overlying said support and having apertures through which said pivots project, an indicator disposed on each pivot and held in frictional contact with said plate by its associated arm, and resilient means disposed on said plate and overlying an end of each said pivot for flexing said resilient arms to release said indicators.

10. An indicating device comprising a support, a plurality of indicators disposed on said support, each movable by gravity from a concealed position to an exposed position, means for retaining said indicators in their concealed positions, means operable by external pressure in a plane perpendicular to the face of said support for selectively releasing each of said indicators for said gravitational movement, and means slidably disposed on said support for simultaneously moving said exposed indicators to their concealed positions.

OVE S. BECK.